(No Model.) 2 Sheets—Sheet 2.

N. NILSON.
STEAM TRAP.

No. 544,744. Patented Aug. 20, 1895.

Witnesses: C. E. Van Dorn, W. E. Hooley

Inventor: Nils Nilson. By Paul A. Hawley, his Attorneys.

UNITED STATES PATENT OFFICE.

NILS NILSON, OF MINNEAPOLIS, MINNESOTA.

STEAM-TRAP.

SPECIFICATION forming part of Letters Patent No. 544,744, dated August 20, 1895.

Application filed February 6, 1895. Serial No. 537,456. (No model.)

*To all whom it may concern:*

Be it known that I, NILS NILSON, of Minneapolis, in the county of Hennepin and State of Minnesota, have invented certain new and useful Improvements in Steam-Traps, of which the following is a specification.

My invention relates to steam-traps for employment in connection with steam-heating or power systems, being means for collecting and disposing of the water of condensation without the loss of steam.

The object of my invention is to provide an automatic steam-trap adapted to close by pressure and adapted to be opened by the collection of water therein while pressure is on, and, further, adapted to open when pressure is relieved, thereby insuring the complete drainage of the trap.

To this end my invention consists in a trap provided with a duplex valve, means in connection therewith for holding the same open when relieved from pressure, pressure areas whereby the valve is closed when steam is admitted to the trap, and a float or like device to be operated by water collecting in the trap, and whereby one part of said valve is adapted to be opened.

Further, my invention consists in helping means employed in connection with the float to partially balance the steam-pressure on the closed valve; further, in means whereby upon the operation of the float and while the said part of the duplex valve is opened thereby the other portion will be quickly unseated, to be as quickly reseated by pressure, the object being to occasionally operate the valve and prevent its sticking; and, further, my invention consists in various details of construction and in combinations, all as hereinafter described, and particularly pointed out in the claims, and will be more readily understood by reference to the accompanying drawings, forming a part of this specification, in which—

Figure 1:
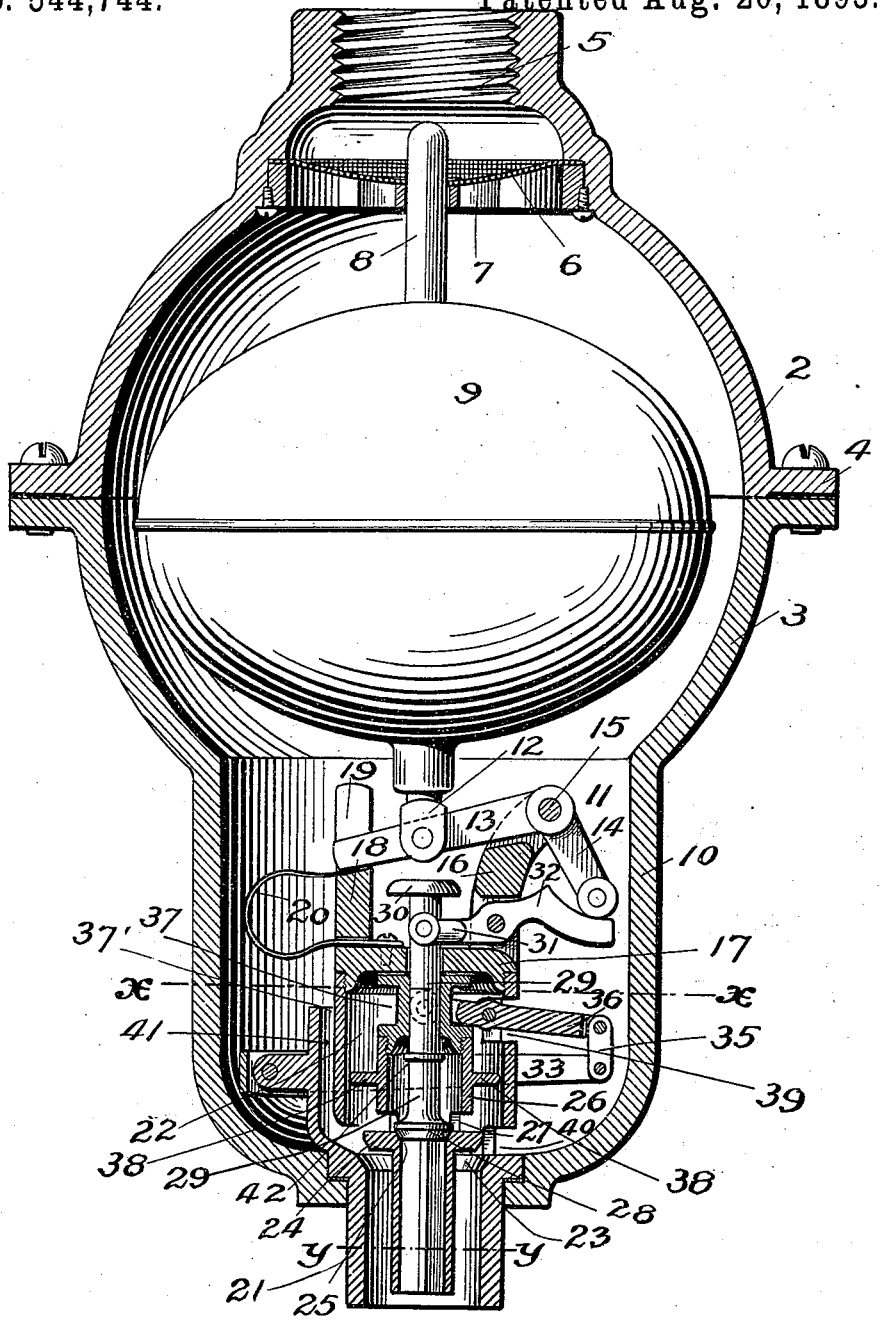
Figure 2:
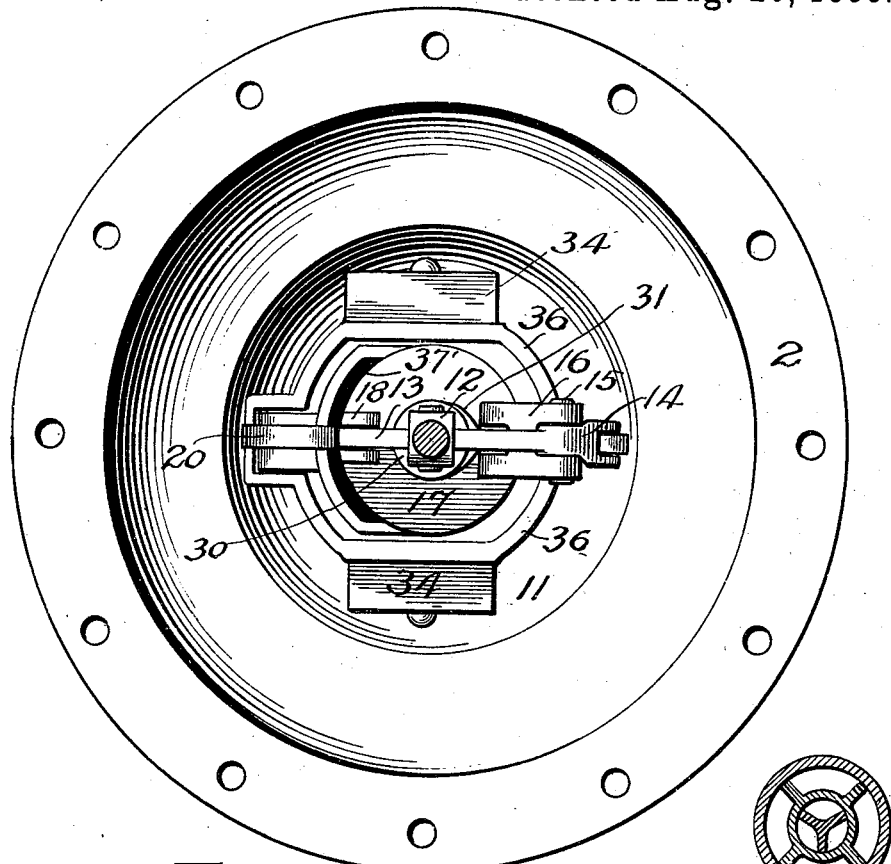
Figure 4:
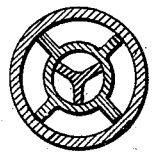
Figure 4:
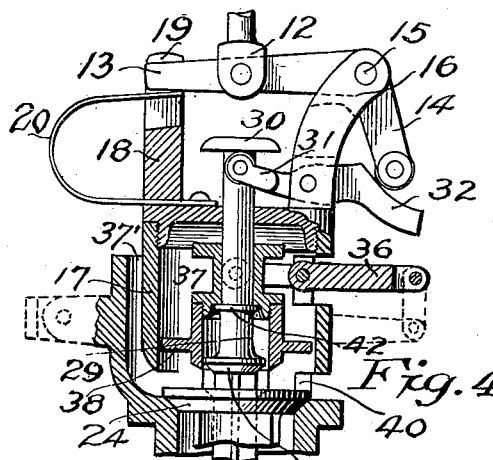
Figure 3:
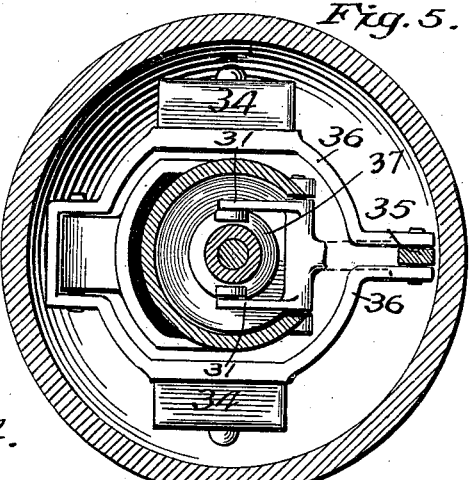

Figure 1 is a vertical section of an automatic steam-trap embodying my invention. Fig. 2 is a plan view of the lower part of the trap, the float being removed. Fig. 3 is a horizontal section on the line $x\,x$ of Fig. 1. Fig. 4 is a sectional detail of the valve, showing the inner part of the duplex valve raised. Fig. 5 shows the centering-wings on the two parts of the valve, line $y\,y$ of Fig. 1.

As shown in the drawings, the trap proper is formed of the two-part casing, the upper and lower parts 2 and 3 of which are provided with flanges 4, fastened together by suitable means. The upper part is provided with a threaded opening 5 to receive the end of a steam-pipe. Beneath this opening is a strainer-sieve 6, preferably supported by a spider 7, in the center of which the top stem 8 of the float 9 has a guide or bearing. The middle portions of the casing preferably have a spherical form, with the lower part 3 provided with the extension 10 to form a chamber 11, adapted to receive the valve. The float 9 has a considerable play in the upper part of the cap or casing, and the stud 12 on its lower side rests upon and is preferably pivotally secured to the cross-arm of the bell-crank 13. This bell-crank is provided with downwardly-extending arms 14, and the pivot-pin 15 of the crank is secured in upwardly-extending arms or lugs 16, formed on the valve-casing 17. A lug 18 is provided upon the opposite side and has a slot 19, wherein the free end of the bell-crank arm is confined, the arm and the float being, in a measure, counterbalanced by a bow-spring 20, secured upon the top of the valve-casing and having its free end in a slot 19 and beneath the end of the bell-crank arm. The weight of the float, however, is greater than the strength of the spring, so that, normally, the float is in its lower position, resting upon the depressed bell-crank.

The valve-casing may be made in any number of parts desired. It has a nipple or extension 21 extending through the opening in the bottom of the casing. The bottom of the chamber 22 is preferably flush with or lower than the bottom of the chamber 11, and at this point a valve-seat 23 is provided in the valve-casing, against which seat the larger valve part 24 of the duplex valve is adapted to close. The arrangement is such that the top of this valve when closed is about on a level with the bottom of the chamber 11, in order that water may flow freely therefrom into the auxiliary valve-opening 25, which is provided within the valve 24. A short hollow valve-stem 26 is provided on the valve 24, and openings 27 are provided in the bottom of the stem. A valve-seat is provided in the opening 25 to receive the small valve 28, the stem 29 of which extends upward through and and is freely movable in the upper part of the stem 26. The stem 29 also extends through an opening in the top of the valve-casing, and its upper end or head is provided with a collar 30, adapted to be engaged by the yoke 31 on a short lever 32 pivoted upon the arm 16. The outer end of this lever is adapted to be engaged by the arm 14 of the bell-crank when the float is raised by water in the trap. Both of the valves are arranged to be lifted and supported when free from pressure, the means employed being a pivoted lever 33, carrying weights 34 (see Figs. 2 and 3) and connected by a link 35 to a short lever 36, pivoted in the casing 17 and having an inner end or yoke confined within a groove 37 in the large valve-stem. On the lower part of the stem 26 I provide a rim or collar 38, the periphery of which closely approaches the walls of the valve-casing, and in the upper part of the valve-casing holes 39 are provided, through which steam will be admitted to act upon the collar or disk 38 and force the two valve parts upon their seats.

The drain-openings 40 in the lower part of the valve-casing are of less area than the opening or openings 39 in the upper part thereof; otherwise the action just described could not take place, as the relief of pressure through the open valve would be too great. One of the openings 40 is preferably extended in a small duct 41. The stem 29 is provided with a small collar 42, and the outer end of the lever 32 given a curved form, all for purposes hereinafter explained.

The operation of my steam-trap is as follows: When there is no pressure of steam within the trap—a normal condition—the float and bell-crank will be at rest, while the weighted lever 33 will raise and support the valve 24 and the valve 28 resting thereon. The valve 28 is thus normally closed, and the inner end of the short lever 32 is depressed, so that both valves may be lowered without its engaging the head 30 upon the inner valve-stem. When steam is admitted to the trap a part thereof will escape through the open valve, while a greater portion, passing through the opening 39, will act upon the collar 38 and depress and close the large valve. Meantime the steam-pressure in the lower part of the casing is sufficient to hold the small valve upon its seat within the larger one. Thus both valves are closed against the action of the weighted lever. The valves will remain closed until sufficient water has collected in the bottom of the trap and rises to such a level that the buoyancy of the float with the aid of the spring 20 overcomes the pressure upon the top of the small valve 28 through the action of the bell-crank and lever 32. The valve 28 will then be opened and the water will flow off slowly until the float is returned to its lower position. The arm 32 is curved in its outer end in order that the first action of the float may be slow and then by the sudden rise accomplish a quick stroke on the valve-stem 29 to overcome pressure of steam upon the top thereof. This quick stroke is materially aided by the spring 20, and when it takes place the stem 29 is thrown up so far that the collar 42 thereon engages the large stem and knocks the large valve off its seat, to which position it will, however, quickly return, as the stem 29 is not retained at its highest stroke or position. In this manner the large valve is frequently lifted, thereby preventing incrustation, which might result in sticking the valve. When pressure is relieved the large valve will be raised by the weighted lever and all of the water in the trap will drain off.

It may occasionally happen that a small quantity of water will be left in the bottom of the trap or that drippings from the steam-pipes will freeze in the bottom of the trap and eventually close the opening between the large valve and the seat and partially close the opening 40. In such a case a sudden rush of water, though it lifted the float, could not be handled, as it could not escape rapidly enough through the diminished opening. To avoid this difficulty I have provided a higher duct 37', by which water may be conducted from a higher level to the open valve 28.

Having thus described my invention, I claim as new and desire to secure by Letters Patent—

1. The combination, in a steam trap, of the trap proper or casing, having an opening in its lower part, a duplex valve provided in said opening and adapted to be closed by steam pressure within the trap, means in connection with the larger part of said valve to open and support the same when relieved from pressure, a float provided in said trap, and independent means in connection therewith for opening the smaller part of said valve against pressure, substantially as described.

2. The combination, in a steam trap, of the trap proper or casing, having an opening in its lower part, a duplex valve provided in said opening and adapted to be closed by steam pressure within the trap, a weighted lever connected with the larger part of said valve to open the valve when relieved from pressure, a float provided in said trap, and independent means in connection therewith for opening the smaller part of said valve against pressure, substantially as described.

3. In a steam trap, the combination, with the trap or casing proper, of a duplex valve provided therein, balancing means in connection with said valve for opening the same when relieved from pressure, the valve casing, a pressure disk provided within said casing and in connection with said valve, whereby the valve will be closed by steam pressure within the trap, means within the trap or casing adapted to be actuated by accumulated water therein, and connections therewith for opening one part of said valve against pressure, substantially as described.

4. In a steam trap, the combination, with the trap or casing proper, of a duplex valve provided therein, balancing means in connection with said valve for opening the same when relieved from pressure, the valve casing, a pressure disk provided within said casing and in connection with said valve, whereby the valve will be closed by steam pressure within the trap, means within the trap or casing adapted to be actuated by accumulated water therein, connections therewith for opening one part of said valve against pressure, said part of the valve adapted when open to momentarily unseat the disk of the other part, substantially as described.

5. The combination, with the trap proper or casing having an opening in its lower part, of a duplex valve composed of concentric valves, one larger than the other and adapted to close said opening when pressure is exerted upon the valve from within the trap, means within the trap for raising the larger part of the valve and therewith the smaller part when pressure is relieved, a float provided in the trap, and a quick acting lever mechanism interposed between the same and the smaller part of the duplex valve whereby said smaller part will be raised against pressure by the lifting of the float, substantially as described.

6. The combination, with the trap proper or casing having an opening in its lower part, of a duplex valve composed of concentric valves, one larger than the other and adapted to close said opening when pressure is exerted upon the valve from within the trap, means within the trap for raising the larger part of the valve and therewith the smaller part, when pressure is relieved, a float provided in the trap, a quick acting lever mechanism interposed between the same and the smaller part of the duplex valve, whereby said smaller part will be raised against pressure by the lifting of the float, means in connection with the two parts of the valve whereby upon the lifting of the smaller part the larger part will be momentarily unseated, substantially as described.

7. The combination, with the outer casing, of a duplex valve provided in the lower part thereof, means for opening said valve when relieved from pressure, said valve adapted to close with pressure, a float, independent gravity means for partially balancing the weight of said float, and a quick acting mechanism in connection with said float for opening one part of said valve against pressure when said float is raised by accumulated water within said outer casing or trap proper, substantially as described.

8. The combination, with the outer casing, of the inner casing, the duplex valve arranged within said inner casing, means whereby pressure within said inner casing will close said valve, balancing means in connection with said valve to open the same when relieved from pressure, the lower part of said inner casing being provided with outlet openings, one of said openings being extended in a vertical duct 41, and a float or like mechanism to be influenced by accumulated water in the trap and adapted to open the inner part of said duplex valve against pressure, substantially as described.

9. The combination, in a steam trap, of the trap proper or casing having an opening in its bottom, the valve casing provided therein and having a valve seat level with or below the bottom of said trap, whereby the trap may be completely drawn, a duplex valve provided in said casing, one of the parts of said valve adapted to be closed upon said seat by pressure from within the trap, gravity means for raising the duplex valve when relieved from pressure, a float provided in the upper part of the trap, a bell crank having one arm pivotally connected with the lower part of said float, and a lever to be engaged by the other arm of said bell crank and in turn adapted to engage and lift the smaller part of said duplex valve when said float is raised, substantially as described.

In testimony whereof I have hereunto set my hand this 23d day of January, A. D. 1895.

NILS NILSON.

In presence of—
FREDERICK S. LYON,
RICHARD PAUL.